(12) United States Patent
Chander et al.

(10) Patent No.: US 7,730,455 B2
(45) Date of Patent: Jun. 1, 2010

(54) METHOD AND APPARATUS FOR ENFORCING SAFETY PROPERTIES OF COMPUTER PROGRAMS BY GENERATING AND SOLVING CONSTRAINTS

(75) Inventors: Ajay Chander, San Francisco, CA (US); Nayeem Islam, Palo Alto, CA (US); David Espinosa, Mountain View, CA (US); Peter Lee, Pittsburgh, PA (US); George Necula, Oakland, CA (US)

(73) Assignee: NTT Docomo, Inc., Tokyo (JP)

( * ) Notice: Subject to any disclaimer, the term of this patent is extended or adjusted under 35 U.S.C. 154(b) by 1037 days.

(21) Appl. No.: 11/268,802

(22) Filed: Nov. 7, 2005

(65) Prior Publication Data
US 2006/0168480 A1 Jul. 27, 2006

Related U.S. Application Data

(60) Provisional application No. 60/626,166, filed on Nov. 8, 2004.

(51) Int. Cl.
G06F 9/44 (2006.01)
(52) U.S. Cl. .......................... 717/126; 717/131
(58) Field of Classification Search ................. 717/131, 717/126
See application file for complete search history.

(56) References Cited

U.S. PATENT DOCUMENTS 5,983,348 A 11/1999 Ji et al.
6,128,774 A 10/2000 Necula et al.
2003/0126590 A1* 7/2003 Burrows et al. ............. 717/154
2004/0031025 A1* 2/2004 Brisset ....................... 717/154

FOREIGN PATENT DOCUMENTS

WO WO 2005/064474 A 7/2005

OTHER PUBLICATIONS

Jeremy W. Nimmer, Michael D. Ernst, Static verification of dynamically detected program invariants Integrating Daikon and ESC/Java, Jul. 2002, ACM SIGSOFT Software Engineering Notes, vol. 27, Issue 4, pp. 229-239.*

Karl Crary, Stephnie Weirich, Resource Bound Certification, Proceedings of the 27th ACM SIGPLAN-SIGACT symposium on Principles of programming languages, 2000, pp. 184-198.*

Rijiv Gupta, Optimizing array bound checks using flow analysis, ACM Letters on Programming Languages and Systems (LOPLAS), Mar.-Dec. 1993, vol. 2, Issue 1-4, pp. 135-150.*

(Continued)

Primary Examiner—Hyung S Sough
Assistant Examiner—Kimberly Jordan
(74) Attorney, Agent, or Firm—Blakely, Sokoloff, Taylor & Zafman LLP

(57) ABSTRACT

A method and apparatus is disclosed herein for generating and solving constraints. In one embodiment, the method comprises modifying program code by inserting one or more dynamic annotations having unsolved variables, generating one or more constraints based on the one or more dynamic annotations using a verifier, solving the one or more generated constraints; and modifying the program code by inserting a dynamic annotation in place of an annotation containing an unsolved variable.

27 Claims, 12 Drawing Sheets

OTHER PUBLICATIONS

David Evans; Static Detection of Dynamic Memory Errors; ACM SIGPLAN Notices; vol. 21, issue 5 (May 1996); pp. 44-53.*

Cormac Flanagan, K. Rustan M. Leino, Mark Lillbridge, Greg Nelson, James B. Saxe, Raymie Stata; Extended static checking for Java; Proceedings of the ACM SIGPLAN 2002 PLDI; Jun. 17-19, 2002; pp. 234-245.*

Aho, A., et al., "Foundations of Computer Science" (C Edition). W. H. Freeman, 1995.

Ermedahl, A., et al., "Deriving Annotations for Tight Calculation of Execution Time", In Proceedings of Euro-Par '97, vol. 1300 of Lecture Notes in Computer Science, pp. 1298-1307.

Hopcroft, J. E., et al., "Introduction to Automata Theory, Languages and Computation", Addison Wesley Publishing Co., Massachusetts, 1979. Chapter 4.

Mitchell, J. C., "Foundation for Programming Languages", MIT Press, 1996. Chapter 11.

Park, C., et al., "Experiments with a Program Timing Tool Based on Source-Level Timing Schema." IEEE Transactions on Computers, 24:48-57, May 1991.

PCT Written Opinion for PCT Appl. No. US2005/040690, mailed May 18, 2007 (7 pages).

International Search Report mailed Apr. 26, 2006. 6 pages.

Written Opinion of the International Searching Authority. 5 pages.

Crary K., et al. "Resource bound certification"., Conference record of Popl '00: the 27th ACM SIGPLAN-SIGACT Symposium on Principles of Programming Languages. Jan. 2000.

Czajkowski G., et al "JRes: a resource accounting interface for Java", Proceeding of the ACM OOPSLA Conference. Oct. 1998.

* cited by examiner $e ::= x \mid n \mid e_1 + e_2 \mid n * e \mid \text{cond}(b, e_1, e_2)$   Integer expressions $b ::= e_1 \geq e_2 \mid e_1 = e_2$   Boolean expressions $c ::= \text{skip} \mid x := e \mid c_1 ; c_2 \mid$
$\quad\quad \text{if } b \text{ then } c_1 \text{ else } c_2 \mid$
$\quad\quad \text{while } b \text{ do } c \mid$
$\quad\quad \text{call } f(\bar{x}) \mid$
$\quad\quad \text{consume } e$   Commands

FIG. 5

| | |
|---|---|
| skip | 0 |
| $x := e$ | 0 |
| File_read($f, s, n$) | $s - n + 1$ |

FIG. 6

$ccg(skip, s)$ = $C(skip, s) = 0$
$ccg(c_1; c_2, s)$ = $C(c_1; c_2, s) = C(c_1, s) + C(c_2, c_1, (s))$
$ccg(x := e, s)$ = $C(x := e, s) = 0$
$ccg(consume\ e, s)$ = $C(consume\ e) = e$
$ccg(if\ b\ then\ c_1\ else\ c_2, s)$ = $C(if\ b\ then\ c_1\ else\ c_2) = cond(b(s), C(c_1, s), C(c_2, s))$
$ccg(while\ b\ do\ c, s)$ = $C(while\ b\ do\ c, s) = cond(b(s),$
$\quad 0, C(c, s) + C(while\ b\ do\ c, c(s)))$
$ccg(call\ f(\bar{x}), s)$ = $C(call\ f(\bar{x})) = e(s)$ when
$\quad\quad$ run_cons$(e)$def $f$ begin $c$ end

```
┌─────────────────────────────────────────────┐
│ Perform static analysis on a computer program, prior
│ to running the computer program, by solving
│ resource constraints in canonical form that represent
│ resource usage by the computer program
│ 1031
└─────────────────────────────────────────────┘
                      │
                      ▼
┌─────────────────────────────────────────────┐
│ Identify one or more constraints having one or more
│ unsolved terms
│ 1032
└─────────────────────────────────────────────┘
                      │
                      ▼
┌─────────────────────────────────────────────┐
│ Identify one term the unsolved terms whose
│ elimination simplifies the one or more constraints to
│ a highest degree
│ 1033
└─────────────────────────────────────────────┘
                      │
                      ▼
┌─────────────────────────────────────────────┐
│ Eliminate the one term by replacing
│ a static measure of a dynamic operation in the
│ computer program with a dynamic operation
│ corresponding to resource use
│ 1034
└─────────────────────────────────────────────┘
```

FIG. 10A

METHOD AND APPARATUS FOR ENFORCING SAFETY PROPERTIES OF COMPUTER PROGRAMS BY GENERATING AND SOLVING CONSTRAINTS

PRIORITY

The present patent application claims priority to the corresponding provisional patent application Ser. No. 60/626,166, titled, "Method and Apparatus for Analyzing and Limiting Resource Use of Sequential Computer Programs", filed on Nov. 8, 2004.

RELATED APPLICATIONS

This application is related to the co-pending application entitled "Flexible and Efficient Method for Limiting the Resource Usage of Computer Programs," filed on Dec. 23, 2003, U.S. patent application Ser. No. 60/532,359, assigned to the corporate assignee of the present invention.

FIELD OF THE INVENTION

The present invention is related to the field of checking of computer programs; more particularly, the present invention is related to performing both static and dynamic checking of computer programs.

BACKGROUND OF THE INVENTION

Programs are created by individuals referred to herein as code producers and run by individuals referred to herein as code consumers. The code consumer does not want to run an untrusted program created by the code producer because the program communicates with the code consumer's computer via a runtime library, which provides functions to access resources such as files and the network. The code consumer wants to be sure that the program is safe, meaning that it does not corrupt user data, it does not export private data to outside sources, and it does not abuse system resources.

There are several existing methods for ensuring safety of a computer program. These include dynamic checking; and static checking. Dynamic checking refers to the process by which each potentially unsafe operation is checked just before it occurs. For example, if a safety policy forbids access to a particular directory, then the runtime (RT) library or RT monitor must check each file access. Dynamic checking has advantages. First, it is precise. That is, it only detects safety violations that the program is actually going to commit. If the checker detects a violation, then the program would actually commit the violation had the user turned off the checker. Second, it is simple. The entire checker consists of simple checks that are placed in the runtime library alongside the appropriate routines. However, dynamic checking has disadvantages. First, it is late because it detects errors at the last possible moment. Lateness is a problem because terminating the program without warning may surprise or confuse the user or cause her to lose valuable data. Also, when terminating the program, it may be difficult to recover operating system (OS) resources that the program has allocated, which may adversely affect the performance of other running programs. Second, dynamic checking is inefficient. Since every operation performs a check before executing, these checks occupy a considerable portion of CPU time.

In static checking, the entire program is analyzed before execution to see whether it is safe. Static checking has advantages. First, static checking is early in that it detects all faults before execution begins. Thus, if the checker verifies the program, no runtime errors can occur, so the user cannot lose data, and the OS never has to terminate the program. Second, static checking is efficient. All checking is done based on the program text, so there are no runtime checks whatsoever, and the program can run at the same speed as a fully trusted program. Static checking also has disadvantages. First, static checking is complex, because it tries to reason about program behavior, which is complex. Second, static checking is incomplete, meaning that it rejects some safe programs. This imprecision comes from two sources. First, programs are complex. Although the checker may be able to handle many simple programs, because many program properties of practical interest are undecidable, there are some safe programs that it cannot verify. Second, the static checker runs with incomplete information in that it knows the program but it does not know its input. The best result state checking can produce is to determine whether some input causes an unsafe action. It cannot determine whether this input actually occurs.

In the context of resource usage, dynamic checking refers to the process by which a resource manager performs checks while the program runs, while static checking refers to the process by which the resource manager performs checks before the program runs. Dynamic checking is flexible but inefficient, while static checking is efficient but inflexible.

Resource use estimation in programs may be considered a problem for estimating execution times of sequential computer programs. Execution time itself can be considered a resource where the basic consumption of each instruction is 1. In contrast, the resource usage of a computer program is often parameterized by the variables of the program. For example, consider the following code fragment:

```
for (i = 0; i < n; ++i) {
  // Write i bytes to file
  file.write (buffer, i);
}
```

The execution time problem for this code looks only at the top level "for" construct and has to analyze the sum $\Sigma_{i=1}^{n} 1$. In contrast, in order to evaluate the resource usage of this program, the sum $\Sigma_{i=1}^{n} i$ is analyzed. Thus, the execution time problem is a special case of the resource usage problem.

For more information on static resource accounting, see A. Ermedahl and J. Gustafsson, Deriving Annotations for Tight Calculation of Execution Time, In Proceedings of Euro-Par'97, Vol. 1300 of Lecture Notes in Computer Science, pp. 1298-1307, August 1999.

With respect to dynamic approaches, a dynamic resource monitor is used to keep track of all resource usage and can be very inefficient. For more information on dynamic resource accounting, see C. Park and A. Shaw, Experiments with a Program Timing Tool Based on Source-level Timing Schema, IEEE Transactions on Computers, 24:48-57, May 1991.

SUMMARY OF THE INVENTION

A method and apparatus is disclosed herein for generating and solving constraints. In one embodiment, the method comprises modifying program code by inserting one or more dynamic annotations having unsolved variables, generating one or more constraints based on the one or more dynamic annotations using a verifier, solving the one or more generated constraints; and modifying the program code by inserting a dynamic annotation in place of an annotation containing an unsolved variable.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 5 illustrates an exemplary full language definition, in a standard Backus-Naur format.

FIG. 6 illustrates an example of a resource accounting policy for the read-disk resource.

FIG. 10A is a flow diagram of one embodiment of a general process for simplifying constraints into a canonical form.

DETAILED DESCRIPTION OF THE PRESENT INVENTION

Figure 1A:
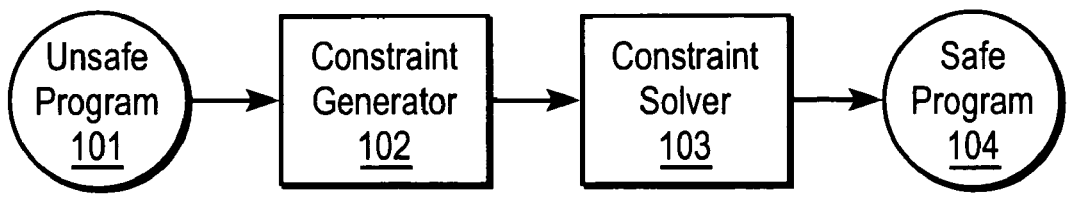
FIG. 1A illustrates a system that enables creating a safe program from an unsafe one.

A method and apparatus for creating a safe computer program from an unsafe computer program are described. For purposes herein, a safe program is one whose behavior is constrained by a safety policy. A safety policy is any policy that can be realized using dynamic checks, for example one that constrains how a program uses a runtime library. Embodiments of the present invention have several primary advantages. First, one or more embodiments produce safe programs that are more efficient than with other approaches. Second, one or more embodiments handle many different safety policies. Third, it is easy to prove that it is correct. This methodology can be applied to ensure resource use safety of a computer program, as well as for estimating resource usage of a computer program.

In one embodiment, programs are modified into safe programs by adding annotations to the program. The annotations are added as a result of analysis having both static and dynamic components.

In one embodiment, the techniques described herein are implemented using four components: a check inserter, a constraint generator, a constraint solver, and a check instantiator. The check inserter receives an unsafe program and adds dynamic checks to the program. These checks include variables, which are not yet determined. The constraint generator receives the program with checks added and produces a set of safety constraints on the variables added by the check inserter. These constraints are necessary and sufficient for program safety. That is, in one embodiment, the program is safe if and only if the constraints are solvable. The constraint solver accepts the set of safety constraints and determines values for the variables created by the check inserter. The check instantiator accepts the solutions produced by the constraint solver and substitutes them into the program's dynamic checks to produce a final, safe program without variables. The new program is similar to the input program, except that it halts before violating the security policy. Thus, in one embodiment, constraints for different parts of a program are statically generated using the computation structure of the program and the constraints are then solved to determine where to place dynamic annotations.

The analysis framework described herein has many applications. For example, as is described below, the analysis framework may determine annotations for a computer program that have direct applications to estimating resource usage and ensuring resource use safety. To that end, one embodiment of the present invention includes two application programming interfaces (APIs): one for resource-use estimation, and one for resource-use safety. In one embodiment, the resources of interest on a platform are captured by a resource accounting policy, which is a map between program instructions and actual usage.

A technique for simplifying static analysis by modifying the program in a way that preserves the semantics of the analysis is also disclosed. This technique adds dynamic annotations (e.g., dynamic checks) to the program. In one embodiment, dynamic checks are added to the program based on constraints that are solved while evaluation the program. The solved constraints enable insertion of the annotations to make the program safe. Those constraints that are unsolvable statically are simplified by dynamic calls.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Overview

The techniques described herein for annotating programs for the purpose of, for example, ensuring safety are below in terms of an application to resource usage, particularly resource use estimation. It should be apparent that these teachings are applicable to other applications.

Resource Use Estimation

In one embodiment, in order to apply the annotation framework to resource estimation, constraints for the resources consumed by different parts of the program are statically generated using an inductive computation on the structure of the program. This process includes annotating computer program code to add one or more operations that apply to resource usage for a portion of the computer program code and determining resource usage of the computer program based on the one or more operation indicating resource consumption of the computer program code. In one embodiment, the resource usage of the computer program code is determined as a set of constraints that relate resource consumption of the portion of the computer program code to resource consumption of components of the portion of the computer program code. The process also includes generating constraints for resources consumed by portions of the computer program code and solving the constraints to determine resource usage by the computer program code as part of determining resource usage of the computer program code. In one embodiment, solving the constraints involves converting the constraints to canonical form and matching the constraints against one or more entries in a knowledge base.

In one embodiment, an analysis method determines the resource usage of an arbitrary sequential computer program, using a consumption condition generator. In one embodiment, the consumption condition generator performs an interprocedural full-program computation as a constraint generation process to generate constraints that are then solved for determining resource usage. More specifically, the consumption condition generator operates on a set of static annotations in the program, and automatically computes static annotations. The static annotations may be provided by a programmer.

In one embodiment, two kinds of annotations are used: basic consumption and compound consumption. Basic consumption annotations map program commands to the resources they use. Compound consumption annotations may be associated with blocks, loops, method calls, and other composite program constructs, and are resource-use expressions for the corresponding program constructs. In one embodiment, compound consumption annotations express the resource usage of each command in terms of the local and global variables that occur in the command. The consumption condition generator captures the property that the compound consumption for a program construct bounds the sum of the basic consumptions of its components. The constraints generated by the consumption condition generator are used to solve for the compound consumption expression for the entire program or block, method, loop, or composite command in question. In addition, in one embodiment, any resource usage expression satisfying the constraints generated by the consumption condition generator is guaranteed to satisfy the resource needs of the program.

The constraint generation process can be applied for any desired granularity of placement for the dynamic annotations. In one embodiment, these constraints are solved using simplification to canonical form and matching against a knowledge base of (constraint, solution) template pairs.

The techniques for resource use estimation may be applied to many types of resources and can be instantiated to explicit resources such as, for example, memory, disk, threads, etc., and implicit resources such as, for example, execution time and energy (based, for example, on CPU instruction counts).

The resource accounting process disclosed herein has applications in all areas where it is useful to estimate the resource usage of a program. Examples include, but are not limited to, real-time program scheduling and estimation (liveness) and resource-use safety of arbitrary code.

Simplifying Static Analysis

Static analysis may be simplified by adding dynamic checks in place of unsolvable constraints. In one embodiment, the simplified static analysis includes receiving program code having one or more annotations and modifying the program code by inserting a dynamic annotation in place of an annotation corresponding to an unsolved constraint. The dynamic annotation may comprise a dynamic call into the program code. The modification occurs while preserving semantics of the checks. In one embodiment, the annotations are inserted into the program code to increase program resource-use safety based on results from solving constraints when evaluating resource usage of the program code. This process may be performed iteratively.

More specifically, after attempting to solve a constraint while evaluating a program, one or more unsolvable constraints may be identified. For example, when evaluating the resource-usage of a program, an unsolvable constraint may be identified. In such a case, these constraints are replaced with dynamic checks. In this way, static and dynamic components are combined together. Thus, in one embodiment, difficult static problems may be eliminated by deferring them to a dynamic evaluator.

In an example embodiment, this methodology is used to verify that a given program is bounded by a stated resource usage expression. In one embodiment, a feedback channel is used in the analysis to indicate constraints that are unsolvable statically. These constraints are simplified using dynamic, resulting in simpler, constraints that may then be solved.

Automatic Annotation for Resource Use Safety

In one embodiment, a program may be automatically annotated for resource use safety. This may occur by adding dynamic annotations using an API that allows for static verification of resource-use safety in an arbitrary sequential computer program. In such a case, the analysis methods for resource estimation and static analysis simplification discussed above may be used to automatically annotate a program with a resource-use API that ensures adequacy of the resource estimate in which safety is directly implied. Thus, the automatic annotator is sound, i.e., any automatically annotated program will pass a static verifier for resource-use safety. In one embodiment, this automatic annotation process includes evaluating resource usage of computer program code and annotating the computer program, by inserting one or more operations into the computer program code for resource use safety, based on a result of evaluating the resource usage of the computer program code. In one embodiment, inserting one or more operations into the computer program code includes removing one or more resource consumption constraints for resource use safety, based on a result of evaluating the resource usage of the computer program code. The operations may be consume operations, to set one or more resource consumption constraints corresponding to the unsolved constraints (terms) to a predetermined value (e.g., zero) in order to achieve resource use safety.

Architecture Overview

The following description describes an embodiment of the architecture applied to resource usage. It should be noted that other applications of the techniques described herein exist.

FIG. 1A is a block diagram of one embodiment of a top level architecture that is used to accept an unsafe program and produce a safe program. As stated above, a safe program is one whose behavior is constrained by a safety policy. The policy specifies limits for the resources that the program uses. These resources can include, for example, network, disk, and CPU, as well as other virtual resources such as process, threads, and handles. The policy also specifies the conditions under which the program can make calls to library functions (or methods). These conditions may constrain both the arguments of functions and the program's state when the call occurs. For example, the program may be able to open files in some directories but not others, and only if the I/O library has been initialized.

The system of FIG. 1A enables creation of a safe program from an unsafe one. Referring to FIG. 1A, the system comprises two subsystems, a constraint generator 102 and a constraint solver 103. An unsafe program 101 is input into constraint generator 102. Constraint generator 102 generates constraints for unsafe program 101. Constraint solver 103 solves the constraints and creates safe program 104.

Figure 1B:
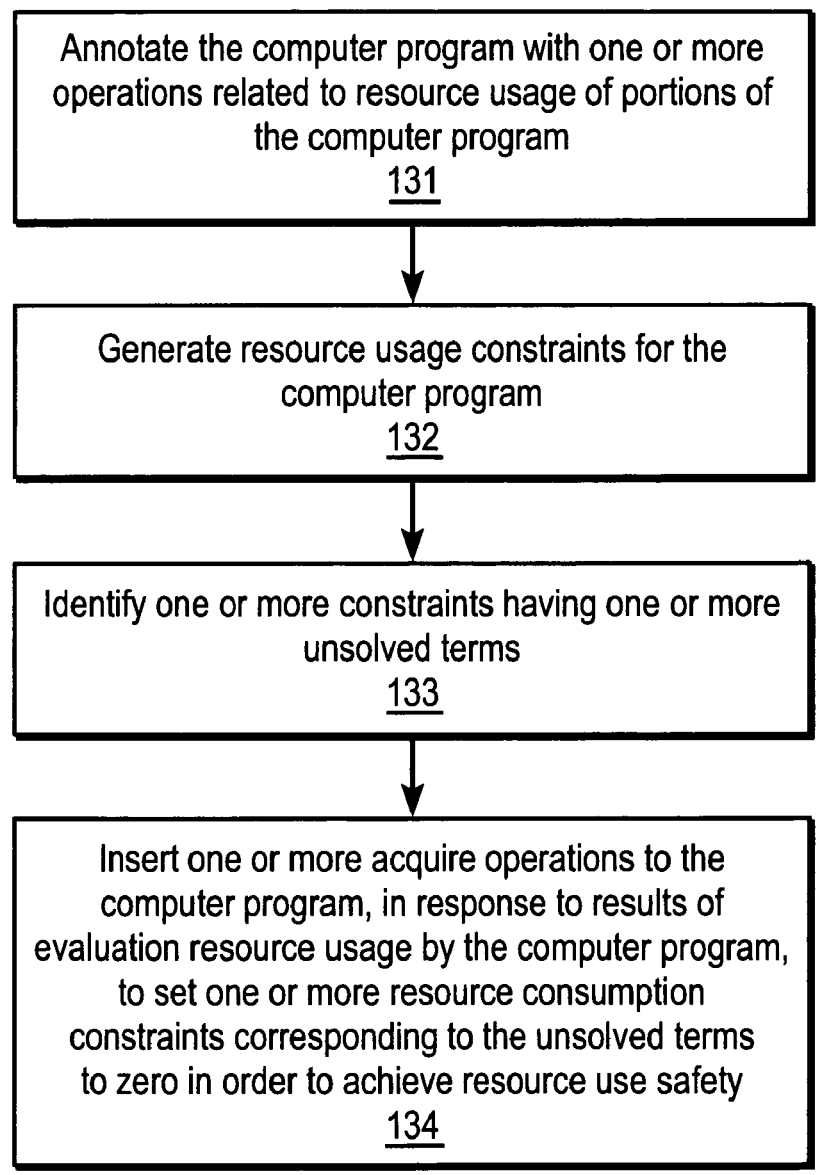
FIG. 1B is a flow diagram of one embodiment of the processing performed by the system of FIG. 1A.

FIG. 1B is a flow diagram of one embodiment of a process performed by the system of FIG. 1A. The process is performed by processing logic that may comprise hardware (e.g., circuitry, dedicated logic, etc.), software (such as is run on a general purpose computer system or a dedicated machine), or a combination of both.

Referring to FIG. 1B, the process begins by annotating the computer program with one or more operations related to resource usage of portions of the computer program (processing block 131). After annotating the program, processing logic generates resource usage constraints for the computer program (processing block 132). After evaluating resource usage, processing identifies one or more constraints having one or more unsolved terms (processing block 133). Next, processing logic insert one or more acquire operations to the computer program, in response to results of evaluation resource usage by the computer program, to set one or more resource consumption constraints corresponding to the unsolved terms to achieve resource use safety (processing block 134).

Figure 2:
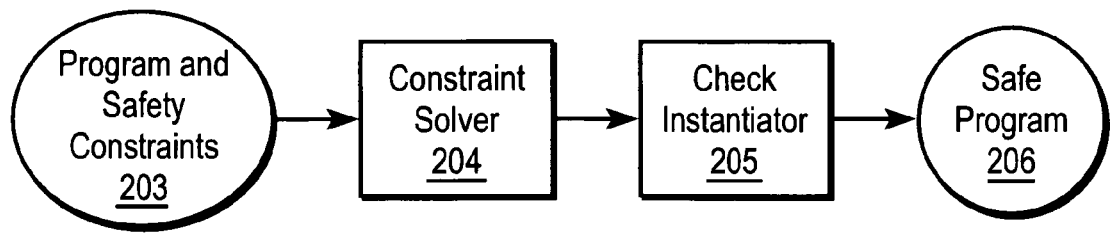
FIG. 2 is a block diagram of one embodiment of a system that accepts an un-safe program and produces a safe program.

FIG. 2 is a block diagram of one embodiment of a safe program generator that accepts an unsafe program and produces a safe program. Referring to FIG. 2, a program and safety constraints are received by the system. In one embodiment, the constraints generated are necessary and sufficient for program safety; that is, the program is safe if and only if the constraints can be solved. In one embodiment, the constraints include variables, and the constraints are solvable if and only if values for these variables exist that satisfy the constraints. This situation is analogous to solving algebraic equations, like $x^2 \leq 10$.

The program with its safety constraints 203 may be generated by an annotator. In one embodiment, the annotator operates in two phases. In the first phase, the annotator creates an integer variable $f_c$ for the resource consumption of each function f, a boolean variable $f_{13}$ pre for the condition under which f is called, and a boolean variable $f_{13}$ post for the condition under which f returns. Since all of these variables can depend on the arguments to f and on the program state, they are written as $f_c(\vec{x},s), f\_pre(\vec{x},s)$, and $f\_post(\vec{x},s)$ for purposes herein. In the second phase, the annotator creates pre and post conditions for each function that state the f_pre is true when f is called, f_post is true when f returns, and fuses no more than $f_c$ resources, and adds these as abstract resource usage annotations. Then a verification condition generator (VCG) generates constraints on the variables f_pre, f_post, and $f_c$. Thus, the VCG discovers constraints whose solution contains safe values.

Constraints solver 204 solves constraints in the program. Check instantiator 205 replaces abstract resource annotations with concrete annotations that do not involve variables. The output of check instantiator 205 is safe program 206.

Figure 3:
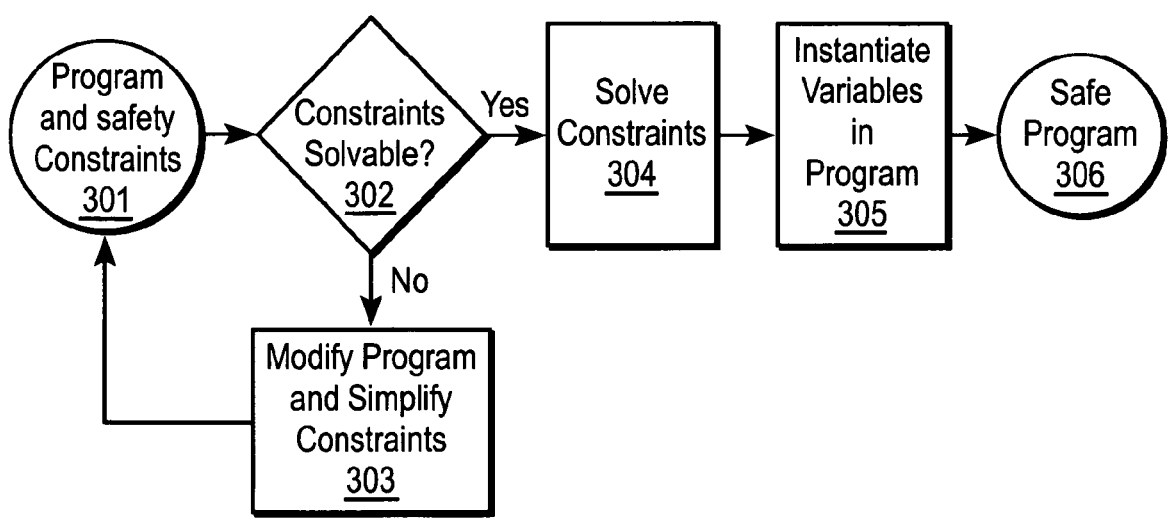
FIG. 3 is a flow diagram of one embodiment of a constraint solver.

FIG. 3 is a flow diagram of one embodiment of a process performed by a constraint solver. Referring to FIG. 3, the constraint solver accepts a program and a set of safety constraints 301 and produces a new safe program 306 that is very similar to the old program, except it avoids violating constraints. In one embodiment, this is accomplished by halting earlier and issuing an error message such as, "stopping to avoid constraint violation". The error message may signal that, if the program continues, it may possibly violate one of the safety constraints. In such a case, the program's execution succeeds if it does not produce this error and fails if it does. If program execution succeeds, it is guaranteed that no violations of the input constraints have occurred. However, if it fails, it is possible that no constraint would actually be violated. That is, the constraint solver is allowed to be conservative and stop even if no violation would actually occur. In one embodiment, the behavior is conservative because it may be very difficult to determine the precise conditions under which a violation will occur, and it is more important that violations are prevented than the maximum set of executions be allowed.

Referring to FIG. 3, processing logic of the constraint solver determines when the constraints of program and safety constraints 301 are solvable (processing block 302). Next, processing logic of the constraint solver modifies both the program and the set of constraints (processing block 303). In one embodiment, processing logic modifies the program in order to simplify the constraints and make them easier to solve. More specifically, processing logic determines how to modify the program by inspecting the constraints, and if the constraints are solvable, processing logic in the constraint solver solves the constraint (processing block 304) and instantiates variables in the program (processing block 305). This results in safe program 306.

Some constraints may be extremely difficult to solve, because program behavior can be arbitrarily complex. In one embodiment, constraint solver simplifies the constraints by ruling out complex behaviors.

In one embodiment, a program is unsafe if and only if it violates the calling convention of some library function. That is, the program either violates the pre-condition of the function, or it calls the library function with insufficient resources. In one embodiment, the constraint solver places a dynamic check immediately before each call to a library function. Such a constraint solver allows the maximum set of safe executions, because it stops precisely the unsafe executions.

In one embodiment, this constraint solver introduces a dynamic check before each call to a library function, or at least before each call to a library function that is constrained by the security policy. In another embodiment, the constraint solver introduces fewer dynamic checks if it can use more intelligence in solving the equations. For example, the constraint solver may realize that some pre-condition is satisfied in all executions, so that no check is actually necessary.

An Exemplary Automated Resource Accounting Architecture

Figure 4A:
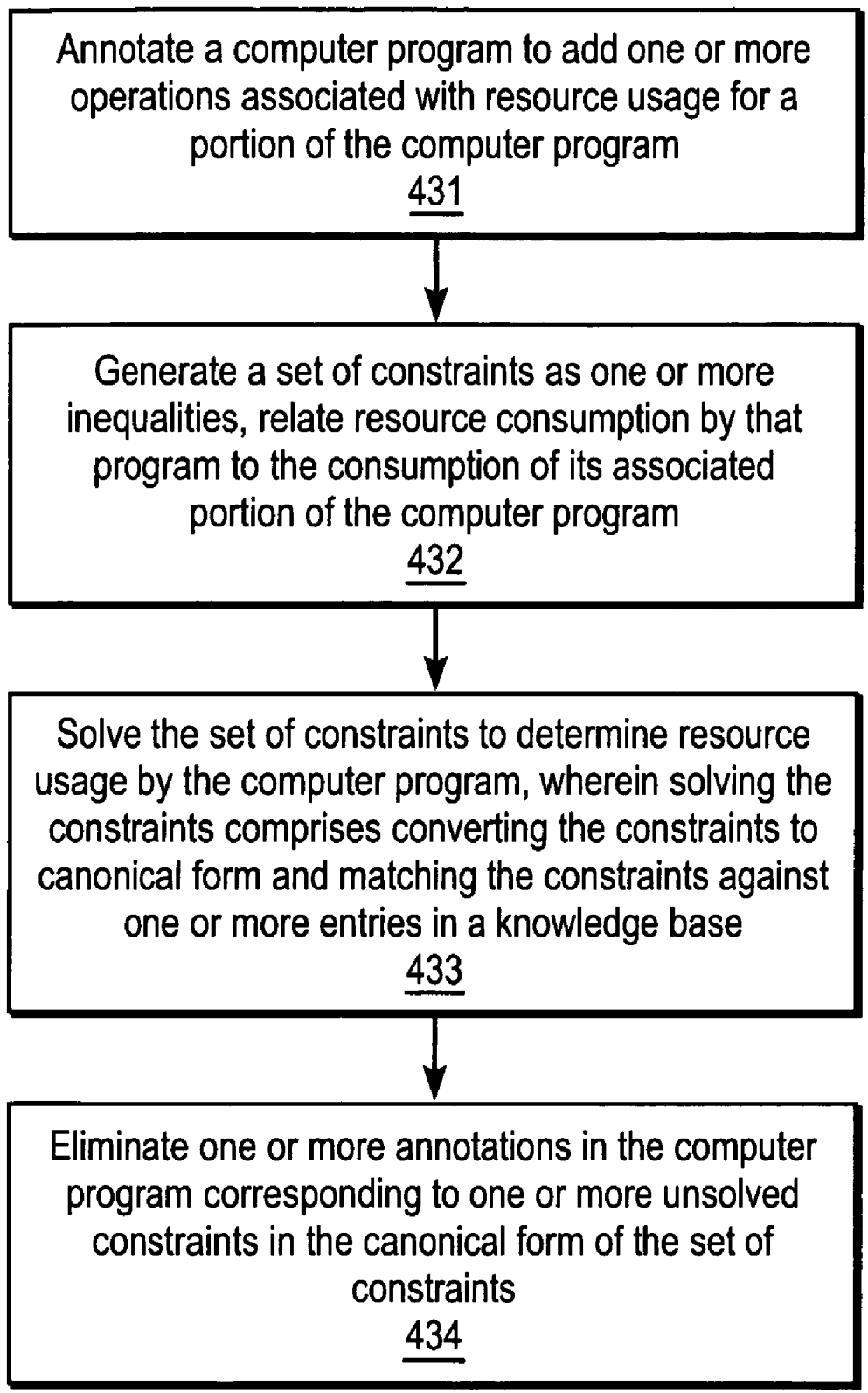
FIG. 4A illustrates a flow diagram of one embodiment of a process for resource use estimation.

FIG. 4A is a flow diagram of one embodiment of a flow diagram of one embodiment of a process for resource use estimation. The process is performed by processing logic that may comprise hardware (e.g., circuitry, dedicated logic, etc.), software (such as is run on a general purpose computer system or a dedicated machine), or a combination of both.

Referring to FIG. 4A, the process begins by processing annotating a computer program to add one or more operations associated with resource usage for a portion of the computer program (processing block 431). After annotating, processing logic generates a set of constraints as one or more inequalities, relate resource consumption by that program to the consumption of its associated portion of the computer program (processing block 432). With the constraints, processing logic solves the set of constraints to determine resource usage by the computer program by converting the constraints to canonical form and matching the constraints against one or more entries in a knowledge base (processing block 433). Next, processing eliminates one or more annotations in the computer program corresponding to one or more unsolved constraints in the canonical form of the set of constraints (processing block 434).

Figure 4B:
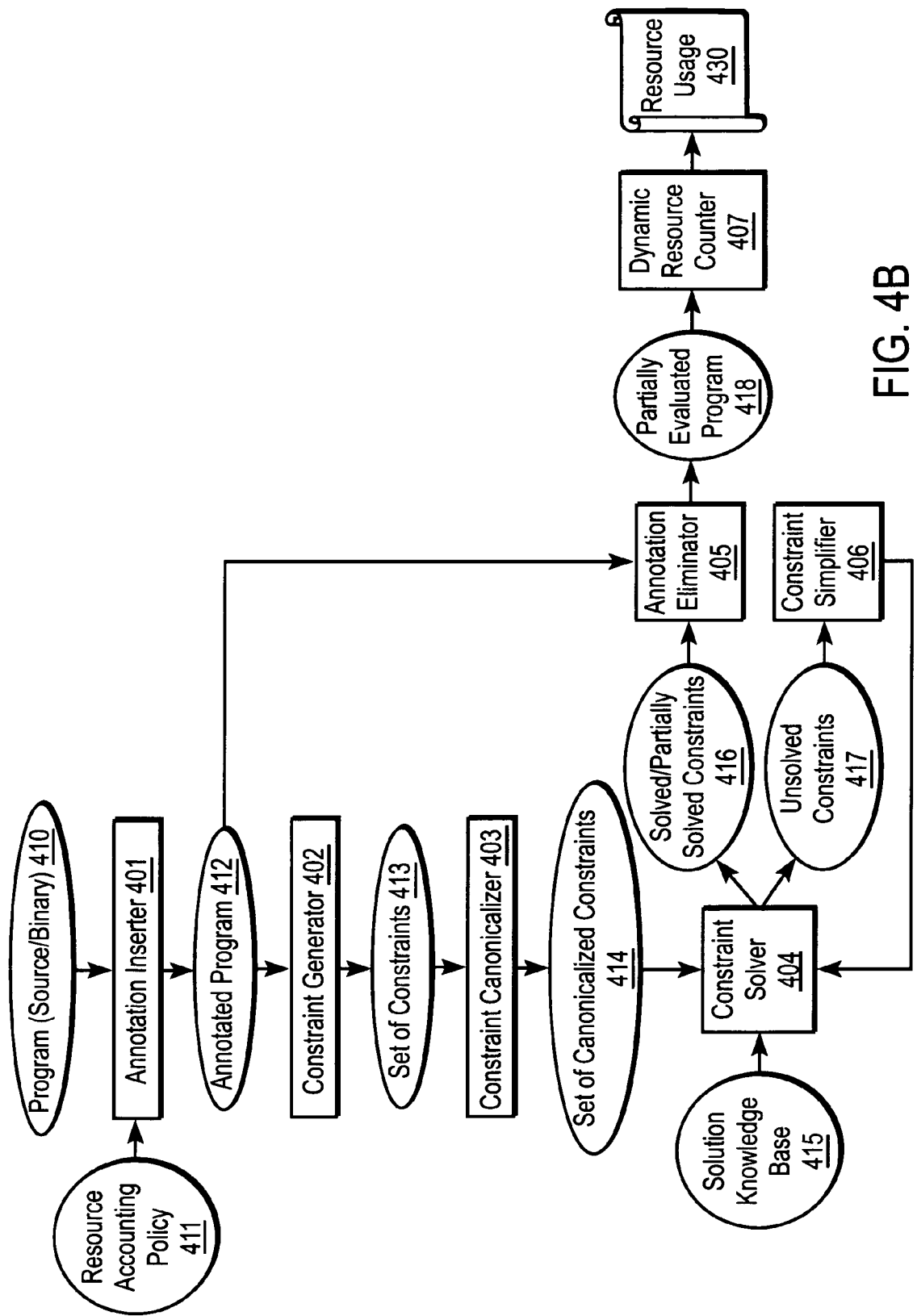
FIG. 4B illustrates a more detailed flow diagram of one embodiment of a process for resource use estimation.

FIG. 4B shows a more detailed flow diagram of one embodiment of a process for resource use estimation. The process is performed by processing logic that may comprise hardware (e.g., circuitry, dedicated logic, etc.), software (such as is run on a general purpose computer system or a dedicated machine), or a combination of both.

Referring to FIG. 4B, annotation inserter 401 receives program 410 (e.g., source, binary) and resource accounting policy 411 and, in response thereto, generates annotated program 412. The resource consumption of the same program may depend on the platform it is being run on, and this dependency is captured using a resource accounting policy 411. In one embodiment, resource accounting policy 411 is used to initially annotate program 410 using an accounting API so that the consumption of commands is made explicit. Thus, in such a case, annotation inserter 401 performs a policy-based annotation.

Constraint generator 402 receives annotation program 412 and captures the resource consumption of the program as a set of constraints 413 that relate the consumption of a block or a method in annotated program 412 to the consumption of its components, which may include other functions or blocks. This approach may be used to handle loops as well, since the consumption of loop may be expressed as the consumption of one unrolling of the loop added to the consumption of the loop from there on, resulting in a recurrence. In one embodiment, the form of these constraints can either be equations or inequations. Equations can capture the resource consumption exactly for different ranges in the domains of the variables of the resource consumption function. Inequations provide a tight upper bound on the resource consumption and help approximate consumption over multiple paths with a single expression, such as is the case in conditionals.

Constraint canonicalizer 405 receives the set of equations generated by constraint generator 402 that contain terms corresponding to method, block, and loop consumption that must be solved for. In one embodiment, in order to solve for a particular term, all the equations are organized by constraint canonicalizer 403 so that the minimal set of equations relevant to that particular term is obtained. This process is called canonicalization, and in one embodiment, involves a standard fix-point style computation. Constraint canonicalizer 403 outputs a set of canonicalizal constraints 404.

In one embodiment, constraint solver 404 receives a set of canonicalizal constraints 404 output from canonicalizer 403 along with an input from solution knowledge base 415 and, in response thereto, identifies any recurrences in the set of canonical equations 414, and matches them against a set of heuristics. In one embodiment, the heuristics are specified in the most general form possible for a particular class of recurrences, and thus unification is required to instantiate the heuristic with the particular instance for the target program. The result of the matching operation is a closed form solution for the term being solved for, which could be the resource consumption of a function, block, loop, or the entire program. The outputs of constraint solver 404 are solved/partially solved constraints 416 and unsolved constraints 417.

Annotation eliminator 405 performs annotation elimination or annotated program 412 based on the solved/partially solved constraints 416. More specifically, the solution of constraints facilitates static estimation, completely or partially, of the resource usage of different commands, corresponding to different regions of the program. Annotation eliminator 405 identifies the core unsolved constraints and the regions of the program they correspond to, and eliminates consumption annotations from these portions of the program. As a result, annotation eliminator 405 outputs partially evaluated program 418. In one embodiment, partially evaluated program 418 includes a minimal number of dynamic consumption annotations.

Partially evaluated program 418 is received by dynamic resource counter 407, which determines resource usage 430 of partially evaluated program 418 by counting resources.

In one embodiment, constraint simplifier 406 reuses unsolved constraints 417 and uses dynamic cost to simplify the results of static analysis. In one embodiment, the static analysis is limited by the constraint solutions available in the knowledge base. The generated constraints relate the arguments of the dynamic annotations placed in the program. If the constraints generated for a specific dynamic annotation are unsolvable, it may be possible to weaken the constraint by inserting an actual dynamic call in the corresponding body of the code. This weakened constraint may then match against a constraint/solution pair in static knowledge base 415 to obtain a dynamic call (annotation) to insert into the program in place of the constraint, resulting in a simplified overall set of constraints. In one embodiment, this feedback process is then iterated until no more constraints are left. Notice that this process terminates because all unsolved constraints are eliminated by inserting dynamic annotations.

An Exemplary Language and Policy Usage

In one embodiment, in order to describe the resource accounting procedure, a simple imperative programming language is used to perform computation with integer values. Assuming there is one resource of interest whose amount is measured in some arbitrary unit, a command consume E is used to model any operation that dynamically uses E units of the resource, where E is an expression in the language. In one embodiment, resource accounting is performed at the level of function calls, and the command run_cons E f($\rightarrow$x) is used to model the static evaluation of the resource use within f($\rightarrow$x), where E will in general depend on $\rightarrow$x.

FIG. 5 shows the full language definition, in a standard Backus-Naur format. Assuming that the variables x take only integer values, the expression cond(b, $e_1$, $e_2$) has value $e_1$ if the boolean expression b has value true and has value $e_2$ otherwise. The propositional connectives ˆ, ∀, ⇒have well-known meaning (as found in any introductory text). The command call f($\rightarrow$x) captures a call to function f with arguments $\rightarrow$x. Functions are defined with the following specification:

def f($\rightarrow$x) begin c end run_cons(e)

Notice that in this language, the static accounting API, run_cons, is used only to annotate functions. While a hand-annotated program may use run_cons in an unrestricted fashion, the automatic accounting procedure of one embodiment only introduces it at function definition points. The constraints generated by the accounting procedure depend on where the run_cons annotations are present in the program. Since one goal is to solve for the consumption of the entire program, these annotations are only at function boundaries in one embodiment.

The usage of a resource for the same program may be platform dependent, and this dependence may be specified in a uniform way. In one embodiment, the Resource Accounting Policy (RAP) for the agent running the given program specifies a map between basic commands and units of the resource in question. In general, the RAP specifies a resource expression for the command, which may refer to the free variables in the command. Basic commands for our language include skip, assignment, and function call. FIG. 6 shows an example of a resource accounting policy for the read-disk resource.

The first step in the resource accounting procedure is to take an unannotated program and transforms it using a resource accounting policy. The transformed program contains known basic consumption annotations for each command, as well as the (as yet unknown) static compound consumption for each function definition. In one embodiment, the transformation is performed according to the following rules and is performed inductively on the structure of the commands. Note also that the annotation is performed for the bodies of all functions, including the main program.

First, for the base case, simple commands (skip, assignment, function call) are preceded by a consume e statement as specified by the resource accounting policy. Second, each compound command (sequencing, conditional, while, and function definition) is recursively treated by applying the transformation in sequence to the component commands of the compound command. For the commands $c_1$; $c_2$ and if b then $c_1$ else $c_2$, the component commands are $c_1$ and $c_2$, and for the commands while b do c and run_cons ef($\rightarrow$x) begin c end, the component command is c.

Figures 7, 8:
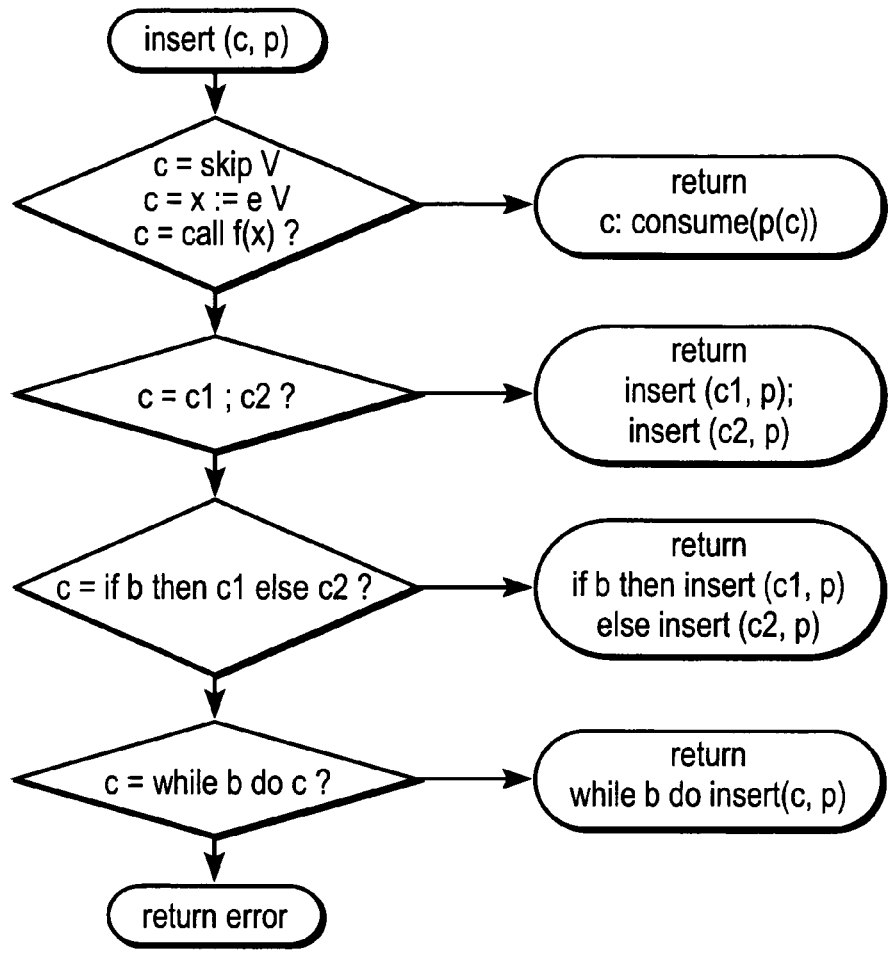
FIG. 7 is a flow diagram of one embodiment of the annotation insertion process.
FIG. 8 is exemplary code for consumption constraint generation.

One embodiment of the annotation inserter is described in the flow diagram of FIG. 7. Note that the resource accounting policy is represented as a map p between commands and resource expressions.

Note that both the resource accounting policy and the initial annotation process can be extended to include consumption annotations for function that are also defined within the program. In this case, in one embodiment, the definitions of those functions would be omitted from the annotation process, and their use would be annotated with a basic consumption annotation using the information provided in the RAP.

An Exemplary Consumption Constraint Generator

Figure 9:
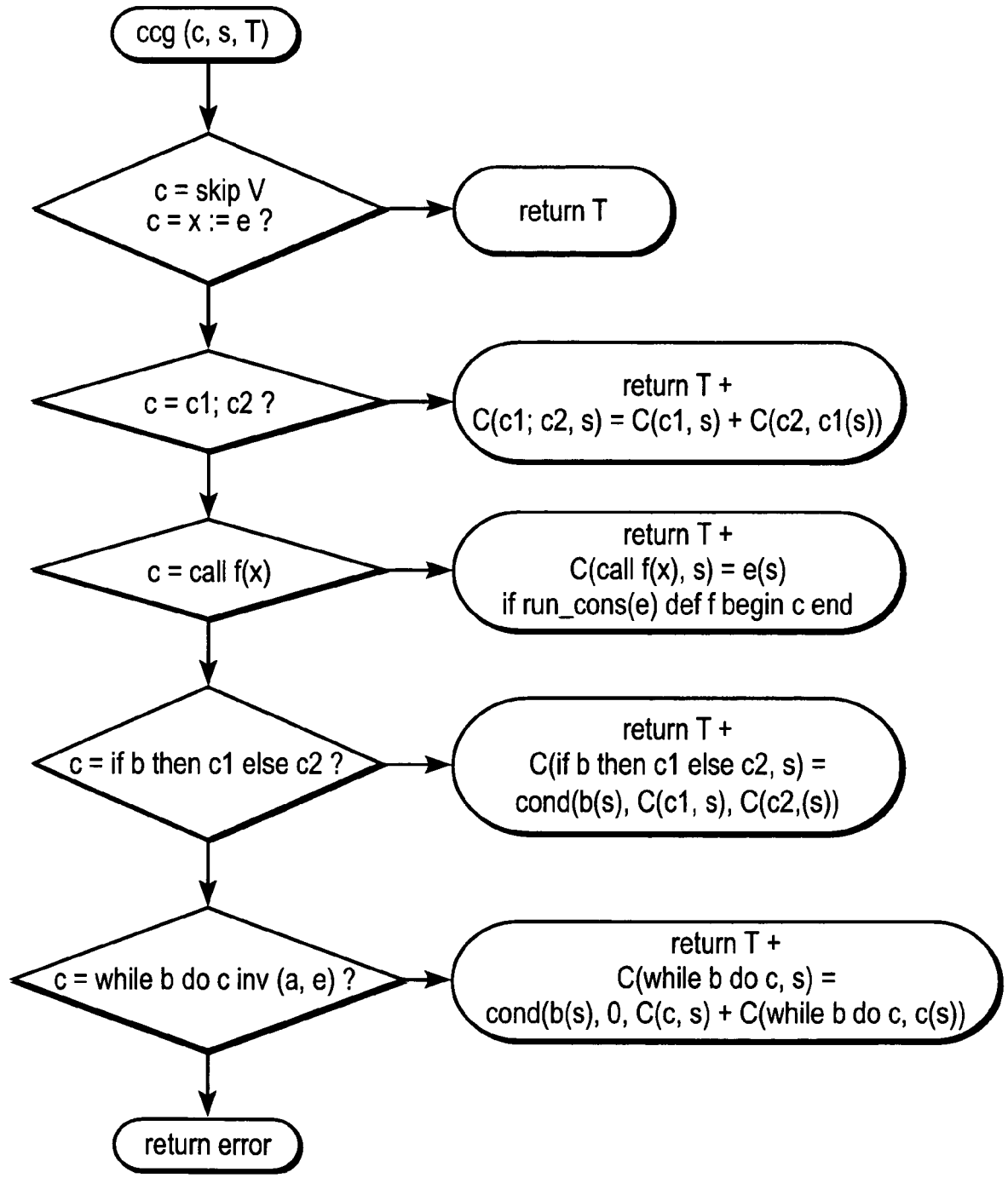
FIG. 9 is a flow diagram of one embodiment of a process for performing consumption constraint generation.

After performing annotation, constraints are generated from the annotated program. FIGS. 8 and 9 illustrate one embodiment of the consumption condition generator (ccg). In several cases, a function is presented in both code and flow-chart forms. In all cases, the two forms are equivalent.

The consumption condition generator (ccg) is defined by recursion on the syntax of commands. Given a command c, a program state s, and a set of constraints T, ccg(c, s, T) produces new constraints regarding the resources consumed by the command c when started in state s. In order to determine the usage of the entire program starting in initial state s0, the original program is wrapped within a top-level main function, and statically solved the constraints generated by ccg(main, s0).

The amount of resources consumed by command c when started in state s is denoted by C(c, s). The ccg generates constraints on values of the map C for the different commands in the program. Since the C command can be completely defined statically, the constraints are solved for as many instances of C(c, s) as possible and include them in the static run_cons annotation for the methods.

Simplifying Constraints

The goal of one embodiment of the constraint generation process is to statically evaluate the run_cons for the entire program. The first step in this process is to simplify the set of constraints so that only C(c, s) are solved for the commands c that actually lie on the control flow path for the program given the initial state. In one embodiment, there are two parts to this process: static elimination and substitution.

With static elimination, for example, it may be possible to statically determine the value of boolean tests and eliminate constraints generated by the branch that isn't taken.

With substitution, the constraints generated by the ccg are organized as a directed rewrite system. Each constraint generated by the ccg is directed from left to right, expressing the consumption of a command in terms of its basic commands. The top-level constraint describes the consumption of the entire program. Given a constraint for x in terms of y, if the constraint for y only refers to a variable z, then x is expressed in terms of z directly. This process is repeated until there are no more substitutions to be made for the top-level constraint.

FIG. 10A is a flow diagram of one embodiment of a process for simplifying constraints. The process of FIG. 10A is performed by processing logic, which may comprise hardware (e.g., circuitry, dedicated logic, etc.), software (such as is run on a general purpose computer system or a dedicated machine), or a combination of both.

Referring to FIG. 10A, the process begins by processing logic by performing static analysis on a computer program, prior to running the computer program, by solving resource constraints in canonical form that represent resource usage by the computer program (processing block 1031). Next, processing logic identifies one or more constraints having one or more unsolved terms (processing block 1032). Using the one or more constraints having one or more unsolved terms, processing logic identifies one term the unsolved terms whose elimination simplifies the one or more constraints to a highest degree (processing block 1033). After the identification process, processing logic eliminates the one term by replacing a static measure of a dynamic operation in the computer program with a dynamic operation corresponding to resource use (processing block 1034).

Figure 10B:
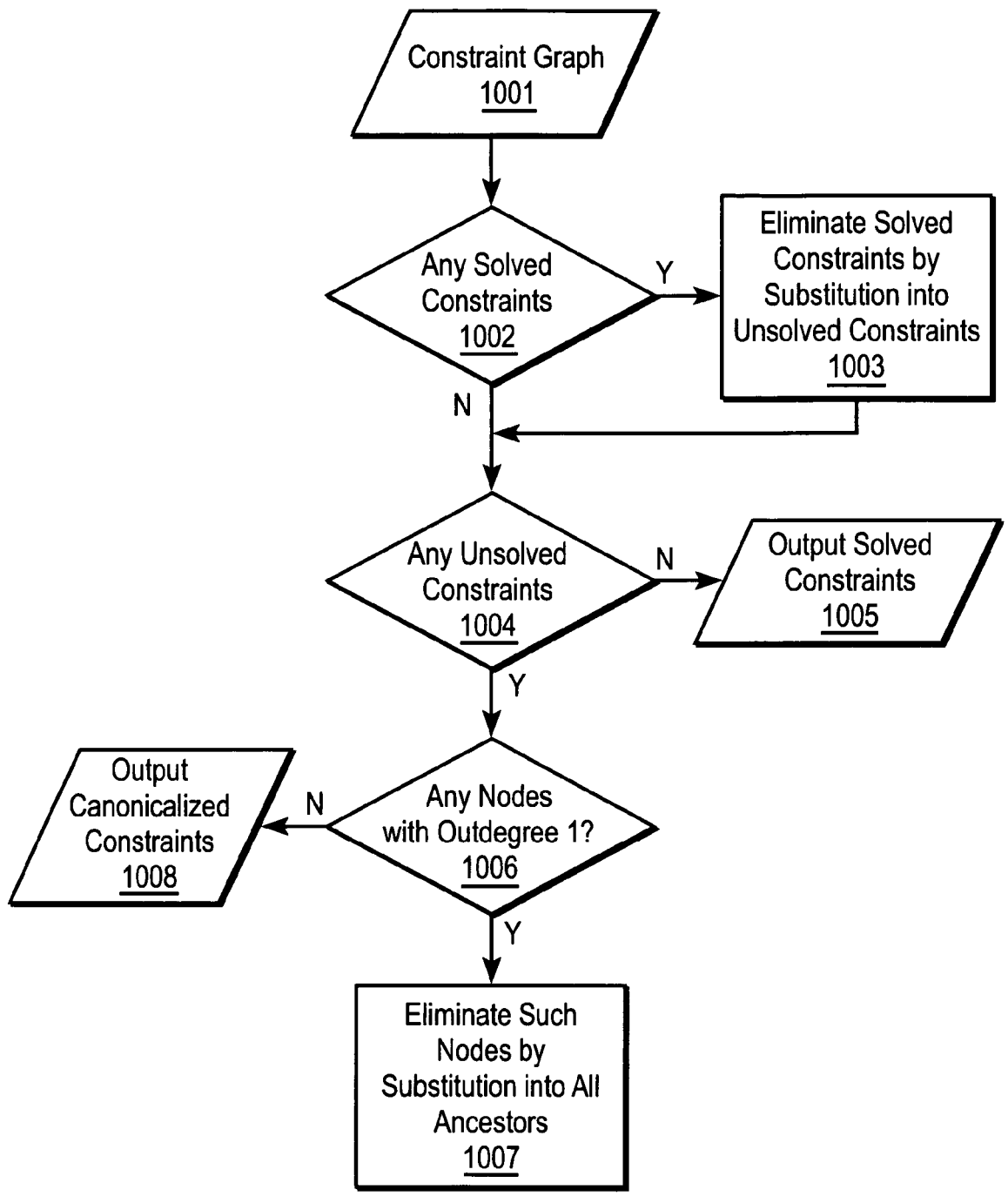
FIG. 10B is a flow diagram of one embodiment of a process for simplifying constraints into a canonical form.

FIG. 10B is a flow diagram of one embodiment of a process for simplifying constraints into a canonical form. The process of FIG. 10B is performed by processing logic, which may comprise hardware (e.g., circuitry, dedicated logic, etc.), software (such as is run on a general purpose computer system or a dedicated machine), or a combination of both. Referring to FIG. 10B, the process begins by processing logic generating a constraint map (processing block 1001). Using constraint map 1001, processing logic tests whether there are any solved constraints (processing block 1002). If there are any solved constraints, processing logic eliminates solved constraints by substitution into unsolved constraints (processing block 1003) and transitions the process to processing block 1004.

The process continues with processing logic determining whether there are any unsolved constraints (processing block 1004). If not, processing logic outputs solved constraints (processing block 1005). If there are unsolved constraints, processing logic tests whether any nodes are with outdegree 1 (processing block 1006). For these nodes, the child node can be folded back into the parent node by a simple substitution. If there are such nodes, processing logic eliminates such nodes by substitution into parents (processing block 1007). If not, processing logic outputs the canonicalized constraints (processing block 1008).

Solving Constraints

The constraints generated by substitution and elimination result either in solved constraints or in systems of recurrences between different variables in the constraints. The complexity of the generated recurrences depends on the control flow in the original program, and cannot be assumed to be of a specific form. Thus, these recurrences are solved by matching against a library of general solution forms for recurrence equations. A client may choose a solution library of any size. A library that captures many different programmatic templates will allow for a better static estimate of resource consumption in the program. As an example, consider the while command below.

$i:=0;$ while (i<10) do
   consume(i);

$i:=i+1$

The simplified constraints generated from the above command describes the consumption of this entire command (say c) in terms of the consumption of the while loop cw (recall that C (i:=i+1)=0):

$C(c, i) = C(cw, i)$ $C(cw, i) = \text{cond}(i\_10, 0, i+0+C(cw, i+1))$

Notice that the consumption expression for the while loop is a recurrence, and assuming that the library contains a general expression for it. Assume that this expression corresponds to the consumption of the following loop:

while (i<c) do
   consume (a.i+b);

$i:=c.i+d$

The constraint generated from the above loop is as follows:

$C(c0w, i) = \text{cond}(i\_c, 0, a.i+b+C(cw, c.i+d))$

The solution to this constraint would be specified in the most general form as C (c0 w, i)=S(i, c, a, b, c, d). In order to match the two constraints we use a standard algorithm for set unification, and then add the solution as a constraint to the original set.

This process is repeated for all the recurrences in the set of constraints. Recurrences that can't be matched against any pattern are left untouched. At the end of this process, there might be a few unsolved C (c, s) left, and these will correspond to dynamic resource counting.

Figure 11:
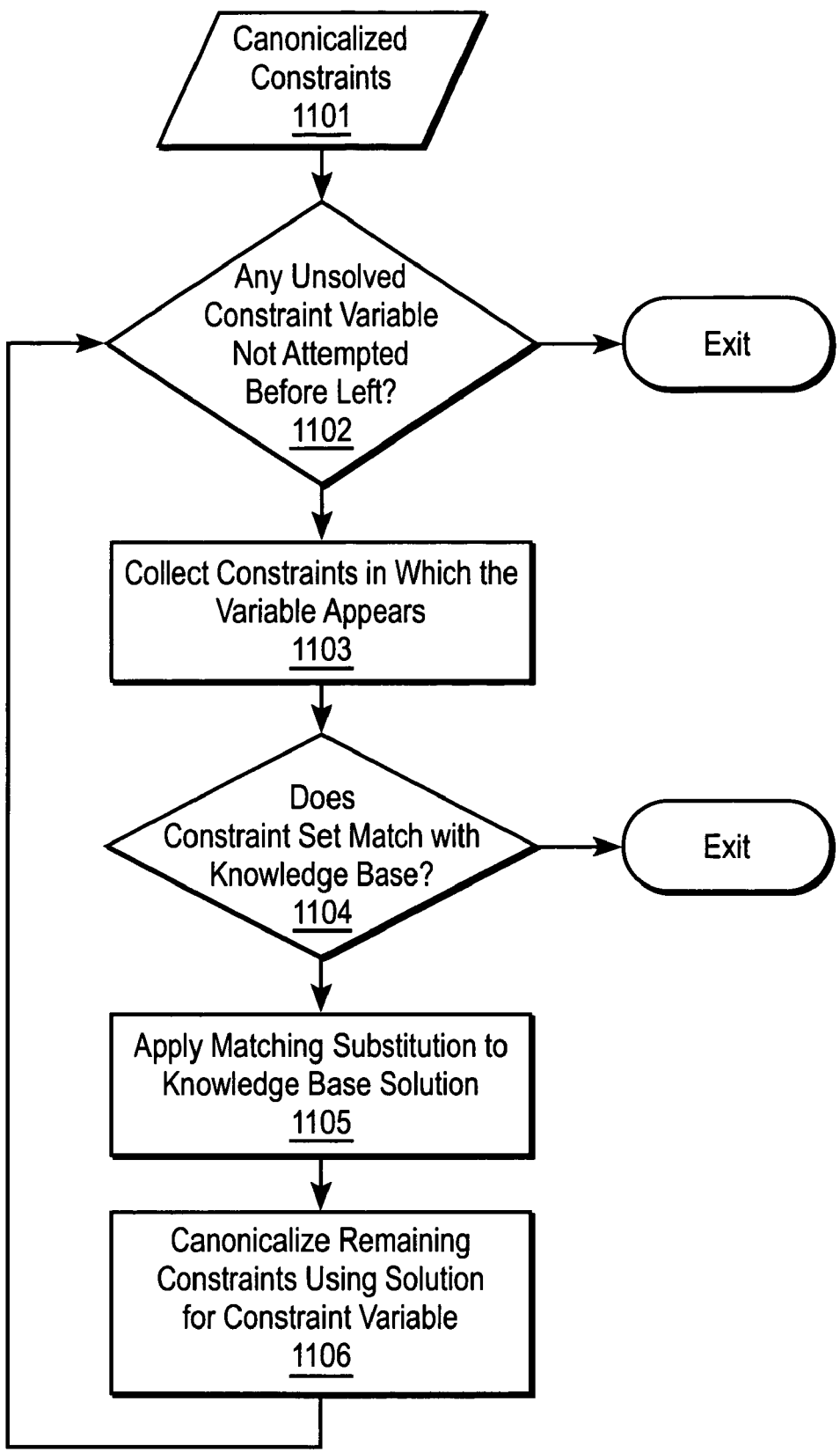
FIG. 11 is a flow diagram of one embodiment of the process for solving constraints.

FIG. 11 is a flow diagram of one embodiment of the process for solving constraints. The process is performed by processing logic which may comprise hardware (e.g., circuitry, dedicated logic, etc.), software (such as is run on a general purpose computer system or a dedicated machine), or a combination of both. Referring to FIG. 11, the process begins by processing logic receiving the canonicalized constraints (processing block 1101). Using the canonicalized restraints, processing logic tests whether there are any unsolved constraint variables not attempted before that remain (processing block 1102). If there are unsolved constraint variables that have not been attempted before that remain, processing logic collects constrains in which the variable appears (processing block 1103) and tests whether the constraint set matches with the knowledge base (processing block 1104). If it doesn't, then the constraint cannot be solved using the knowledge base matching method and the process exits. If it does, processing logic applies a matching substitution to a knowledge based solution (processing block 1105) and canonicalizes the remaining constraints using a solution for the constraint variable (processing block 1106). Thereafter, processing transitions to processing block 1102 and the process is repeated.

Eliminating Dynamic Consume Operations

The next step in this process eliminates all the dynamic consumes that were introduced in the initial annotation, and have been covered by the static calculation. An unsolved C(c, s) in the constraints renders the commands that it is a part of (and ultimately the entire program) statically unsolvable for resource consumption. However, in order to collect the parts of the syntax tree for which resource consumption was determined into the run_cons static annotation on each method. Thus, the following is performed:

1. Starting from the directed graph corresponding to the simplified constraints, nodes corresponding to solved constraints are replaced by the solution expressions.
2. These expressions are folded by a process of repeated substitution into the higher level nodes.
3. Given the final graph with solutions for the constraints, the lowest level nodes are selected. The commands corresponding to these nodes have a cost that will be determined dynamically. Then all consume commands are eliminated from the program except for the ones that appear within these commands identified above.

Figure 12:
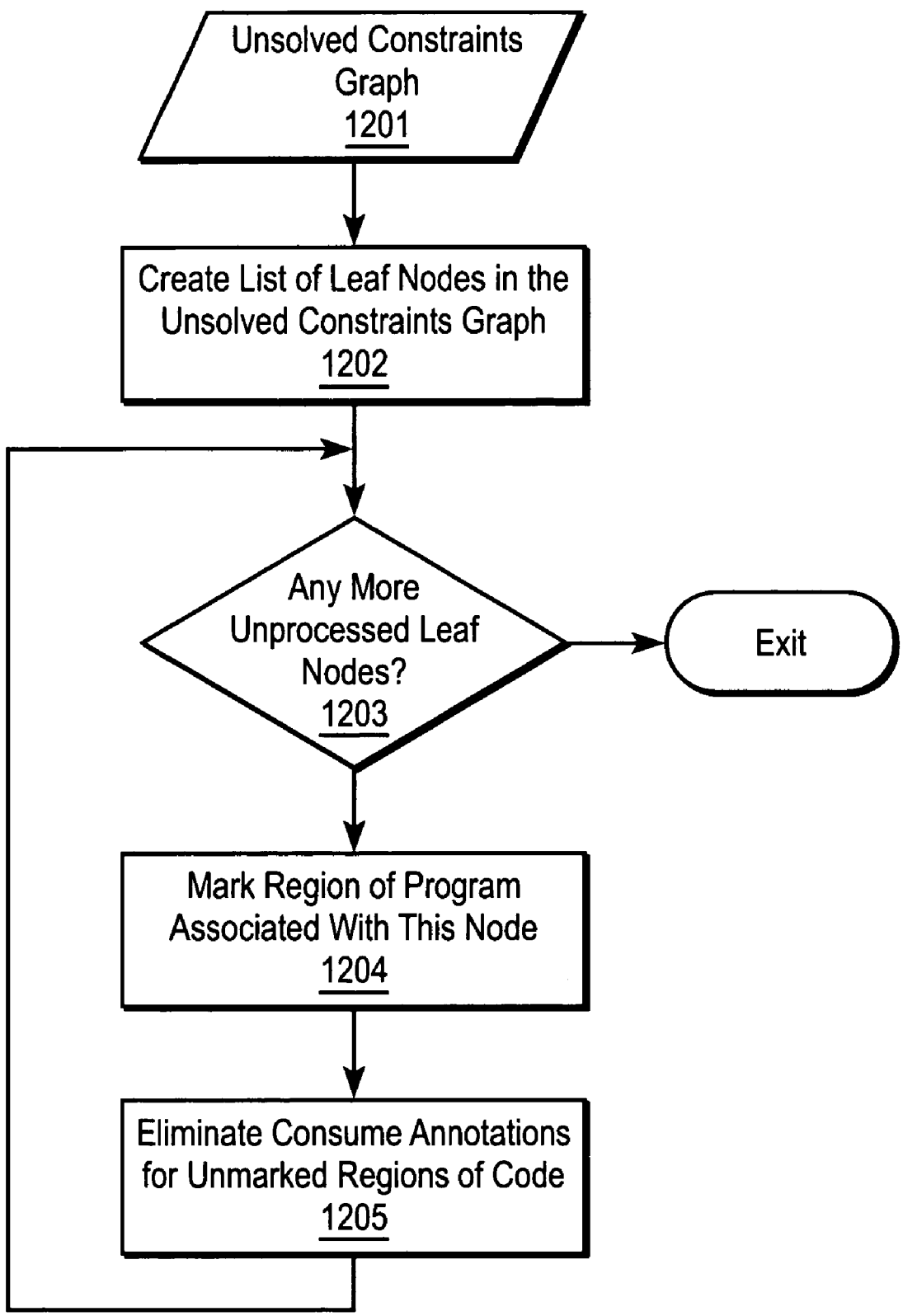
FIG. 12 is a flow diagram of one embodiment of a process for eliminating annotations for which resource accounting has been performed statically.

FIG. 12 is a flow diagram of one embodiment of a process for eliminating annotations for which resource accounting has been performed statically. The process is performed by processing logic which may comprise hardware (e.g., circuitry, dedicated logic, etc.), software (such as is run on a general purpose computer system or a dedicated machine), or a combination of both. Referring to FIG. 12, the process begins by processing logic receiving the unsolved constraints map (processing block 1201). Using the unsolved constraint graph, processing logic creates a list of leaf nodes in the unsolved constraint graph (processing block 1202). Processing logic then tests whether there are any more unprocessed leaf nodes (processing block 1203. If not, processing ends. If there are, processing logic marks the region of the program associated with this node (processing block 1204) and eliminates consumed annotations for the marked regions of code (processing block 1205) and the process transitions to processing block 1203 where processing repeats.

Constraint Simplifier

Next, one embodiment of a constraint simplification is performed. In one embodiment, the process employed is as follows. First, each unsolved constraint has an expression on the right hand side that involves terms related to dynamic annotations. An elimination order is chosen for eliminating sets of subterm. For example, one elimination order can look at single subterms first, then subterms sets of size 2, and so on. Second, for each eliminated subterm set, the resultant constraint is matched against the knowledge base. If there is no match, the process continues on using elimination order to the next candidate elimination. If there is a match, the eliminated subterm set is recorded as well as the generated solution. Third, amongst the successful matches, the solution of the most poly-nomial complexity is selected. This corresponds to the most difficult subterms that could have been eliminated. Fourth, the eliminated subterms are sent to the annotation eliminator, and the simplified constraints are sent back to the constraint solver. The feedback loop then iterates over the same procedure.

This general static analysis simplification technique is applicable to APIs where a dynamic operation can cache the results of static analysis. In addition, the dynamic operation admits a way of self-combination, i.e., it is possible to statically ensure that a particular dynamic operation is equivalent to the combination of two or more dynamic operations.

Thus, techniques for annotating programs for resource-use safety are disclosed. One or more of the following advantages are associated with embodiments of the present invention. The resource bounds shown for a program can be efficiently verified. The technique works both with annotated and unannotated code, providing the programmer with flexibility in specifying the resource usage of their programs. In one embodiment, the constraints generated by the consumption constant generator are in the form of inequalities which facilitates to combining usage in different parts of the program, such as in the different branches of the conditional. Moreover, the annotations introduced herein allow combining of static analysis and dynamic resource monitoring to provide precision in resource usage estimation without significant lack of performance. In addition, the static analysis described herein infers tight upper bounds for resource usage in loops. Furthermore, in one embodiment, the techniques are defined in terms of control structures in sequential computer programs and, thus, are applicable across the spectrum of such languages, from bytecode to source. Also, the analysis performed as part of is inter-procedural and the generated resource expressions are in a most general form, in terms of relevant globals, locals, and function parameters.

An Exemplary Computer System

Figure 13:
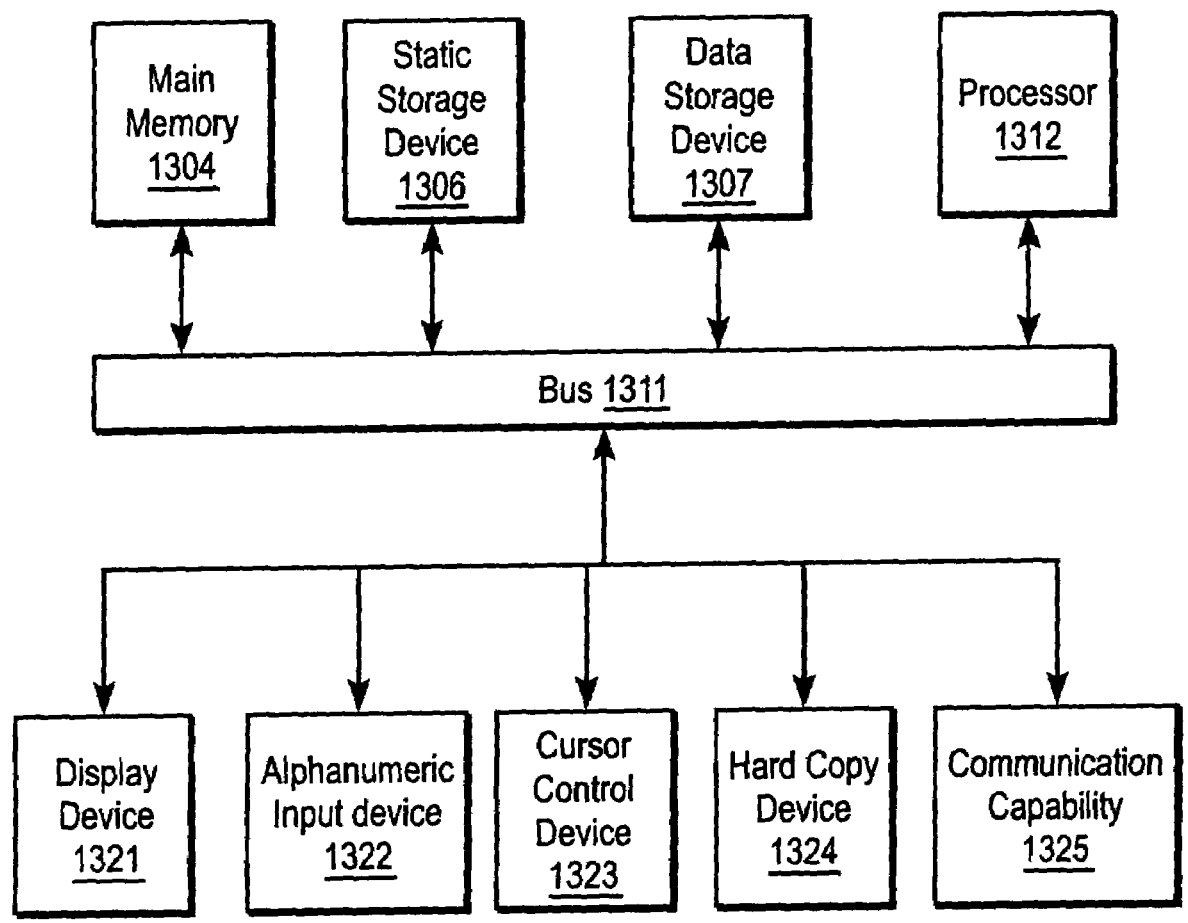
FIG. 13 is a block diagram of an exemplary computer system that may perform one or more of the operations described herein.

FIG. 13 is a block diagram of an exemplary computer system that may perform one or more of the operations described herein. Referring to FIG. 13, the computer system may comprise an exemplary client or server computer system. The computer system comprises a communication mechanism or bus 1311 for communicating information, and a processor 1312 coupled with bus 1311 for processing information. Processor 1312 includes a microprocessor, but is not limited to a microprocessor, such as, for example, Pentium™, PowerPC™, Alpha™, etc.

The system further comprises a random access memory (RAM), or other dynamic storage device 1304 (referred to as main memory) coupled to bus 1311 for storing information and instructions to be executed by processor 1312. Main memory 1304 also may be used for storing temporary variables or other intermediate information during execution of instructions by processor 1312.

The computer system also comprises a read only memory (ROM) and/or other static storage device 1306 coupled to bus 1311 for storing static information and instructions for processor 1312, and a data storage device 1307, such as a magnetic disk or optical disk and its corresponding disk drive. Data storage device 1307 is coupled to bus 1311 for storing information and instructions.

The computer system may further be coupled to a display device 1321, such as a cathode ray tube (CRT) or liquid crystal display (LCD), coupled to bus 1311 for displaying information to a computer user. An alphanumeric input device 1322, including alphanumeric and other keys, may also be coupled to bus 1311 for communicating information and command selections to processor 1312. An additional user input device is cursor control 1323, such as a mouse, trackball, trackpad, stylus, or cursor direction keys, coupled to bus 1311 for communicating direction information and command selections to processor 1312, and for controlling cursor movement on display 1321.

Another device that may be coupled to bus 1311 is hard copy device 1324, which may be used for printing instructions, data, or other information on a medium such as paper, film, or similar types of media. Furthermore, a sound recording and playback device, such as a speaker and/or microphone may optionally be coupled to bus 1311 for audio interfacing with the computer system. Another device that may be coupled to bus 1311 is a wired/wireless communication capability 1325 to communication to a phone or handheld palm device.

Note that any or all of the components of the system and associated hardware may be used in the present invention. However, it can be appreciated that other configurations of the computer system may include some or all of the devices.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A method comprising:
    modifying program code by inserting one or more dynamic annotations having unsolved variables, the unsolved variables being in the form of arguments of the dynamic annotations;
    generating one or more constraints on the unsolved variables based on the one or more dynamic annotations using a verifier, the generated constraints relating the unsolved variables to program variables;
    statically solving the one or more generated constraints in terms of variables of the program code to determine values for the unsolved variables; and
    modifying the program code by inserting a dynamic annotation with a determined variable value in place of an annotation of the one or more annotations having unsolved variables, the dynamic annotation having a dynamic call executable during run time.

2. The method defined in claim 1 wherein modifying the program code occurs while preserving semantics of the dynamic annotation.

3. The method defined in claim 1 further comprising:
    generating resource usage constraints for the program code; and
    wherein solving the one or more constraints comprises solving constraints generated while evaluating resource usage of the program code.

4. The method defined in claim 1 further comprising automatically inserting annotations into a program to increase program resource-use safety based on results from solving constraints.

5. The method defined in claim 1 further comprising:
    evaluating the program code based on a resource accounting policy to identify one or more resource consumption annotations; and
    annotating the program code by inserting one or more of the identified consumption annotations into the program code based on the evaluation.

6. The method defined in claim 5 further comprising:
    evaluating the consumption constraints placed on the program code;
    dynamically feeding back information regarding the consumption constraints; and
    annotating the computer program, by inserting one or more dynamic consumption annotations in response to the feedback information.

7. The method defined in claim 1 further comprising:
    performing static analysis on the program code, prior to running the program code, by solving constraints in canonical form;
    identifying one or more constraints having one or more unsolved terms; and
    iteratively
        identifying one term from among the unsolved terms whose elimination simplifies the one or more constraints to a highest degree, and
        eliminating the one term by replacing the one term in the program code with a dynamic operation.

8. The method defined in claim 7 wherein the dynamic operation is a call to a dynamic evaluator into the program code that is invoked during run-time of the program code.

9. The method defined in claim 1 wherein the dynamic annotations capture resource usage of a corresponding portion of the program code.

10. The method defined in claim 1 wherein modifying the program code by inserting one or more dynamic annotations that have unsolved variables comprises inserting only one annotation at the beginning of the program related to resource usage, which is then used to estimate resource usage for the program code.

11. An article of manufacture having one or more recordable media storing instructions thereon which, when executed by a system, cause the system to perform a method comprising:
    modifying program code by inserting one or more dynamic annotations having unsolved variables, the unsolved variables being in the form of arguments of the dynamic annotations;
    generating one or more constraints on the unsolved variables based on the one or more dynamic annotations using a verifier, the generated constraints relating the unsolved variables to program variables;
    statically solving the one or more generated constraints in terms of variables of the program code to determine values for the unsolved variables; and
    modifying the program code by inserting a dynamic annotation with a determined variable value in place of an annotation of the one or more annotations having unsolved variables, the dynamic annotation having a dynamic call executable during run time.

12. The article of manufacture defined in claim 11 wherein the method further comprises:
    generating resource usage constraints for the program code; and
    wherein solving the one or more constraints comprises solving constraints generated while evaluating resource usage of the program code.

13. The article of manufacture defined in claim 11 wherein the method further comprises:
    evaluating the consumption constraints placed on the program code;
    dynamically feeding back information regarding the consumption constraints; and
    annotating the computer program, by inserting one or more dynamic consumption annotations in response to the feedback information.

14. An apparatus comprising:
    a memory; and
    a processor coupled to a memory, to execute instructions stored in the memory to perform a method comprising:
    modifying program code by inserting one or more dynamic annotations having unsolved variables, the unsolved variables being in the form of arguments of the dynamic annotations;
    generating one or more constraints on the unsolved variables based on the one or more dynamic annotations using a verifier, the generated constraints relating the unsolved variables to program variables;
    statically solving the one or more generated constraints in terms of variables of the program code to determine values for the unsolved variables; and
    modifying the program code by inserting a dynamic annotation with a determined variable value in place of an annotation of the one or more annotations having unsolved variables, the dynamic annotation having a dynamic call executable during run time.

15. A method comprising:
   evaluating resource usage of computer program code; and
   annotating the computer program, by inserting one or more operations into the computer program code that will cause one or more operations to be performed when the program code is executed for resource use safety, based on a result of evaluating the resource usage of the computer program code.

16. The method defined in claim 15 wherein inserting one or more operations comprises inserting one or more operations into the computer program code to remove one or more resource consumption constraints.

17. The method defined in claim 15 wherein evaluating comprises:
   identifying one or more constraints in the computer program code having one or more unsolved terms;
   evaluating resource usage by the computer program code corresponding to the identified constraints;
   determining values for the identified constraints corresponding to the unsolved terms in order to achieve resource use safety based on the evaluating;
   setting one or more resource consumption constraints corresponding to the unsolved terms to the determined values; and wherein annotating comprises:
   inserting one or more acquire operations into the computer program code corresponding to the unsolved terms to a predetermined value in order to achieve resource use safety.

18. The method defined in claim 17 wherein the predetermined value is zero.

19. The method defined in claim 15 wherein the computer program code with annotations is sound with respect to a resource-usage safety policy.

20. The method defined in claim 15 further comprising statically verifying the computer program code with annotations for resource-use safety.

21. An article of manufacture having one or more recordable media storing instructions thereon which, when executed by a system, cause the system to perform a method comprising:
   evaluating resource usage of computer program code; and
   annotating the computer program, by inserting one or more operations into the computer program code that will cause one or more operations to be performed when the program code is executed for resource use safety, based on a result of evaluating the resource usage of the computer program code.

22. The article of manufacture defined in claim 21 wherein inserting one or more operations comprises inserting one or more operations into the computer program code to remove one or more resource consumption constraints.

23. The article of manufacture defined in claim 21 wherein the method further comprises identifying one or more constraints in the computer program code having one or more unsolved terms; and wherein annotating further comprises inserting one or more acquire operations into the computer program code, in response to results of evaluation resource usage by the computer program code, to set one or more resource consumption constraints corresponding to the unsolved terms to a predetermined value in order to achieve resource use safety.

24. The article of manufacture defined in claim 23 wherein the predetermined value is zero.

25. The article of manufacture defined in claim 21 wherein the computer program code with annotations is sound with respect to a resource use safety policy.

26. The article of manufacture defined claim 21 further comprising statically verifying the computer program code with annotations for resource-use safety.

27. An apparatus comprising:
   a memory; and
   a processor coupled to a memory, to execute instructions stored in the memory to perform a method comprising
   evaluating resource usage of computer program code; and
   annotating the computer program, by inserting one or more operations into the computer program code that will cause one or more operations to be performed when the program code is executed for resource use safety, based on a result of evaluating the resource usage of the computer program code.

* * * * *